United States Patent
Hillan et al.

(10) Patent No.: US 9,112,541 B2
(45) Date of Patent: *Aug. 18, 2015

(54) METHODS AND APPARATUS FOR IMPROVING NFC DATA EXCHANGE CONFIGURATION PARAMETER UPDATE MECHANISMS

(71) Applicant: QUALCOMM Incorporated, San Diego, CA (US)

(72) Inventors: John Hillan, Farnborough (GB); Dubai Chingalande, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/465,219

(22) Filed: Aug. 21, 2014

(65) Prior Publication Data

US 2015/0044967 A1 Feb. 12, 2015

Related U.S. Application Data

(63) Continuation of application No. 13/626,528, filed on Sep. 25, 2012, now Pat. No. 8,838,026.

(60) Provisional application No. 61/542,027, filed on Sep. 30, 2011.

(51) Int. Cl.
*H04B 5/00* (2006.01)
*G06K 7/10* (2006.01)

(52) U.S. Cl.
CPC .......... *H04B 5/0031* (2013.01); *G06K 7/10297* (2013.01)

(58) Field of Classification Search
CPC ... G06K 19/0723; G06K 7/0008; H04B 5/02; H04B 5/0012; H04B 5/00
USPC .......... 455/41.1–41.3, 78–80, 500, 507, 517, 455/550.1, 561, 562.1
See application file for complete search history.

(56) References Cited

U.S. PATENT DOCUMENTS 8,045,996 B2   10/2011   Brunner et al.
8,060,012 B2   11/2011   Sklovsky et al.
(Continued)

FOREIGN PATENT DOCUMENTS

EP   2112634 A1   10/2009
WO   WO-2006080435 A1   8/2006

OTHER PUBLICATIONS

Co-pending U.S. Appl. No. 13/483,763, filed May 30, 2012.
(Continued)

*Primary Examiner* — Nhan Le
(74) *Attorney, Agent, or Firm* — Charles E. Eggers (57) ABSTRACT

Aspects disclosed herein relate to improving mechanisms for prompting a NFCC to update data exchange parameters for ISO-DEP communications between a DH and a remote NFC endpoint. In an example, with a NFC device a DH may be configured to receive an activation message from a NFCC that is using a Frame RF interface over NFC-B RF technology, determine that one or more data exchange parameters included in the activation message are different from one or more corresponding current relevant data exchange parameters that the NFCC is configured to implement, generate an RF parameter update command including the one or more data exchange parameters corresponding to the one or more current relevant data exchange parameters that are determined to be different, and send the generated RF parameter update command to the NFCC to prompt the NFCC to update the one or more corresponding current relevant data exchange parameters.

48 Claims, 8 Drawing Sheets

(56) References Cited

U.S. PATENT DOCUMENTS

| | | | |
|---|---|---|---|
| 8,135,379 B2 | 3/2012 | Ramachandran et al. | |
| 8,588,830 B2 | 11/2013 | Myer et al. | |
| 8,838,026 B2* | 9/2014 | Hillan et al. | 455/41.1 |
| 2009/0193500 A1* | 7/2009 | Griffin et al. | 726/2 |
| 2010/0227553 A1 | 9/2010 | Charrat et al. | |
| 2010/0330904 A1 | 12/2010 | Stougaard | |
| 2011/0275316 A1* | 11/2011 | Suumaki et al. | 455/41.1 |
| 2012/0045989 A1 | 2/2012 | Suumaeki et al. | |
| 2012/0178365 A1 | 7/2012 | Katz et al. | |
| 2013/0102247 A1 | 4/2013 | Hillan et al. | |

OTHER PUBLICATIONS

Identification Cards—Contactless Integrated Circuit(S) Cards—Proximity Cards—Proximity Cards—//Cartes D Identification—Cartes A Circuit(S) Integre(S) Sans Contact—Cartes De Proximite—, International Standard ISO/IEC, XX, XX, No. 1444-3, Feb. 1, 2001, pp. I-VII,01, XP001146902.

International Search Report and Written Opinion—PCT/US2012/058032—ISA/EPO—Jan. 17, 2013.

"Smart Cards; UICC-CLF interface; Host Controller Interface P2P LNC Protocol (Document inputted in NFC Forum for information)", ETSI Draft;SCPT080001, European Telecommunications Standards Institute (ETSI), 650, Route Des Lucioles ; F-06921 Sophia-Antipolis ; France, No. V0.1.0, Jan. 11, 2008, pp. 1-33, XP014051745, [retrieved on Jan. 11, 2008].

Smart cards; UICC-CLF interface; CLF Host Controller Interface (Release 7), ETSI Draft; SCPT070016 Update of HCI Specification, European Telecommunications Standards Institute (ETSI), 650, Route Des Lucioles; F-06921 Sophia-Antipolis; France, V0.2.0, Jan. 19, 2007, pp. 1-88, XP014051635, [retrieved on Jan. 19, 2007].

* cited by examiner

METHODS AND APPARATUS FOR IMPROVING NFC DATA EXCHANGE CONFIGURATION PARAMETER UPDATE MECHANISMS

CLAIM OF PRIORITY UNDER 35 U.S.C. §120

The present application for patent claims priority to Provisional Application No. 61/542,027, titled "METHODS AND APPARATUS FOR IMPROVING NFC DATA EXCHANGE CONFIGURATION PARAMETER UPDATE MECHANISMS," filed Sep. 30, 2011, which is assigned to the assignee hereof and hereby expressly incorporated by reference herein.

The present application for patent is a continuation of U.S. patent application Ser. No. 13/626,528, titled "METHODS AND APPARATUS FOR IMPROVING NFC DATA EXCHANGE CONFIGURATION PARAMETER UPDATE MECHANISMS," filed Sep. 25, 2012, which is assigned to the assignee hereof and hereby expressly incorporated by reference herein.

BACKGROUND

The disclosed aspects relate generally to communications between devices and specifically to methods and systems for improving mechanisms for prompting a Near Field Communication (NFC) controller (NFCC) to update data exchange parameters for international standards organization data exchange protocol (ISO-DEP) communications between a device host (DH) and a remote NFC endpoint.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

When NFC is implemented, a NFC enabled device may initially detect a NFC tag and/or target device. Thereafter, communications between NFC devices may use an ISO-DEP. The present draft of the NFC Forum Controller Interface (NCI) specification does not address all functionality required to use the ISO-DEP.

At present, NCI defines two RF Interfaces that a device may use when communicating using ISO-DEP RF Protocol: ISO-DEP and Frame. If the NFC Controller is relatively sophisticated, it may be able to handle the ISO-DEP protocol, and ISO-DEP RF Interface may be used, reducing the processing load on the Device Host. If the NFC Controller is less capable and/or has a known bug, Frame RF Interface can be used. In such an implementation, the NFC Controller merely passes protocol activation, data, and protocol deactivation messages on to the Device Host for processing. Currently, when activating ISO-DEP using Frame RF Interface over NFC-B RF Technology, there are parameters in the activation command and response (ATTRIB command and ATTRIB response) that are needed by the NFC Controller, but since the NFC Controller merely passes on the data to the DH the specification does not provide a mechanism for the NFCC to learn these values.

Thus, improved apparatus and methods for providing improved mechanisms for updating data exchange parameters for ISO-DEP communication between a DH and a remote NFC endpoint using interfaces such as a frame RF interface and an ISO-DEP RF protocol may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects as a prelude to the more detailed description presented later.

Various aspects are described in connection with improving mechanisms for prompting a NFCC to update data exchange parameters for ISO-DEP communications between a DH and a remote NFC endpoint. In an example, with a NFC device a DH may be configured to receive an activation message from a NFCC that is using a Frame RF interface over NFC-B RF technology, determine that one or more data exchange parameters included in the activation message are different from one or more corresponding current relevant data exchange parameters that the NFCC is configured to implement, generate an RF parameter update command including the one or more data exchange parameters corresponding to the one or more current relevant data exchange parameters that are determined to be different, and send the generated RF parameter update command to the NFCC to prompt the NFCC to update the one or more corresponding current relevant data exchange parameters.

According to related aspects, a method improving mechanisms for prompting a NFCC to update data exchange parameters for ISO-DEP communications between a DH and a remote NFC endpoint. The method can include receiving, by a DH, an activation message from a NFCC that is using a Frame RF interface over NFC-B RF technology. The method may also include determining that one or more data exchange parameters included in the activation message are different from one or more corresponding current relevant data exchange parameters that the NFCC is configured to implement. Further, the method may include generating an RF parameter update command including the one or more data exchange parameters corresponding to the one or more current relevant data exchange parameters that are determined to be different. Moreover, the method can include sending the generated RF parameter update command to the NFCC to prompt the NFCC to update the one or more corresponding current relevant data exchange parameters with the one or more data exchange parameters included in the RF parameter update command.

Another aspect relates to a communications apparatus. The communications apparatus can include means for receiving, by a DH, an activation message from a NFCC that is using a Frame RF interface over NFC-B RF technology. The communications apparatus can also include means for determining that one or more data exchange parameters included in the activation message are different from one or more corresponding current relevant data exchange parameters that the NFCC is configured to implement. Further, the communications apparatus can include means for generating an RF parameter update command including the one or more data exchange parameters corresponding to the one or more current relevant data exchange parameters that are determined to be different. Moreover, the communications apparatus can include means for sending the generated RF parameter update command to the NFCC to prompt the NFCC to update the one or more corresponding current relevant data exchange parameters with the one or more data exchange parameters included in the RF parameter update command.

Another aspect relates to a communications apparatus. The apparatus can include a DH configured to receive an activation message from a NFCC that is using a Frame RF interface over NFC-B RF technology. The DH may also be configured to determine that one or more data exchange parameters included in the activation message are different from one or more corresponding current relevant data exchange parameters that the NFCC is configured to implement. Further, the DH may be configured to generate an RF parameter update command including the one or more data exchange parameters corresponding to the one or more current relevant data exchange parameters that are determined to be different. Moreover, the DH may be configured to send the generated RF parameter update command to the NFCC to prompt the NFCC to update the one or more corresponding current relevant data exchange parameters with the one or more data exchange parameters included in the RF parameter update command.

Another aspect relates to a computer program product, which can have a computer-readable medium comprising code for receiving, by a DH, an activation message from a NFCC that is using a Frame RF interface over NFC-B RF technology. The computer-readable medium can also include code for determining that one or more data exchange parameters included in the activation message are different from one or more corresponding current relevant data exchange parameters that the NFCC is configured to implement. Further, the computer-readable medium can include code for generating an RF parameter update command including the one or more data exchange parameters corresponding to the one or more current relevant data exchange parameters that are determined to be different. Moreover, the computer-readable medium can include code for sending the generated RF parameter update command to the NFCC to prompt the NFCC to update the one or more corresponding current relevant data exchange parameters with the one or more data exchange parameters included in the RF parameter update command.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

As described herein, a device may recognize a NFC target device and/or tag when within range of the coverage area of the NFC device and/or reader/writer. Thereafter, the device may obtain sufficient information to allow for communications to be established. One form of communications that may be established is an ISO-DEP communication link. Communications between the devices may be enabled over a variety of NFC RF technologies, such as but not limited to, NFC-A, NFC-B, etc.

Generally, when activating ISO-DEP poll side over NFC-B using Frame RF Interface, a DH may select values for a number of data exchange communication parameters (e.g., Minimum TR0, Minimum TR1, Minimum TR2, Suppress SoS, and Suppress EoS). The DH may use some or all of these values in an activation command which it sends to the Remote NFC Endpoint. Because some or all of these values may be needed by the local NFC Controller, the DH may then pack these values into an octet as defined in Table 4 below in an RF_PARAMETER_UPDATE_CMD and send an RF_PARAMETER_UPDATE_CMD to the NFCC. The NFCC may then extract the relevant values and use them as appropriate for subsequent data exchange.

Additionally, when activating ISO-DEP listen side over NFC-B using Frame RF Interface, a NFC Controller may pass an activation command it receives from a remote NFC endpoint to a device host (DH). The DH may interpret the received activation command and, assuming it is valid, may extract a number of values from the command (e.g., Minimum TR0, Minimum TR1, Minimum TR2, Suppress SoS, and Suppress EoS), or it may select values for some or all of these variables. The DH may then pack these values into an octet as defined in Table 4 below in an RF_PARAMETER_UPDATE_CMD and send an RF_PARAMETER_UPDATE_CMD to the NFCC. The NFCC may then extract the values and use them as appropriate for subsequent data exchange.

Figure 1:
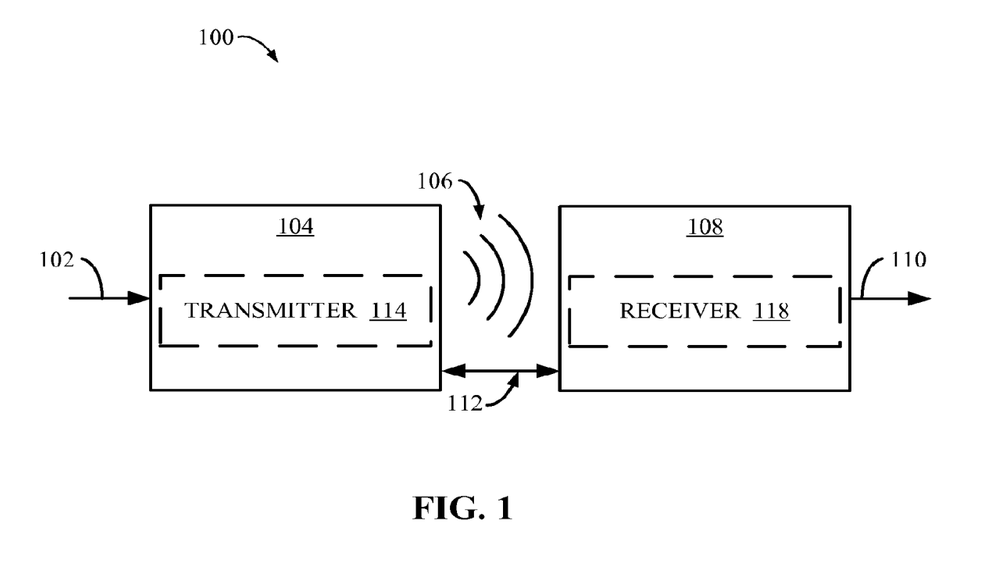
FIG. 1 is a block diagram of a wireless communication system according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In an exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
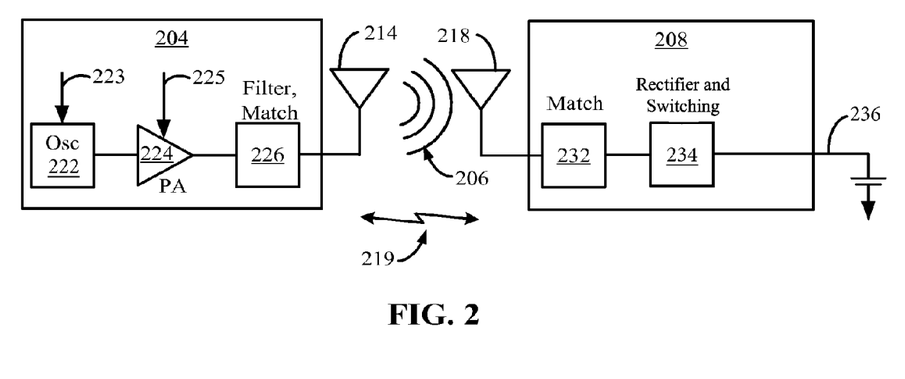
FIG. 2 is a schematic diagram of a wireless communication system according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, Zigbee, cellular, etc.).

Figure 3:
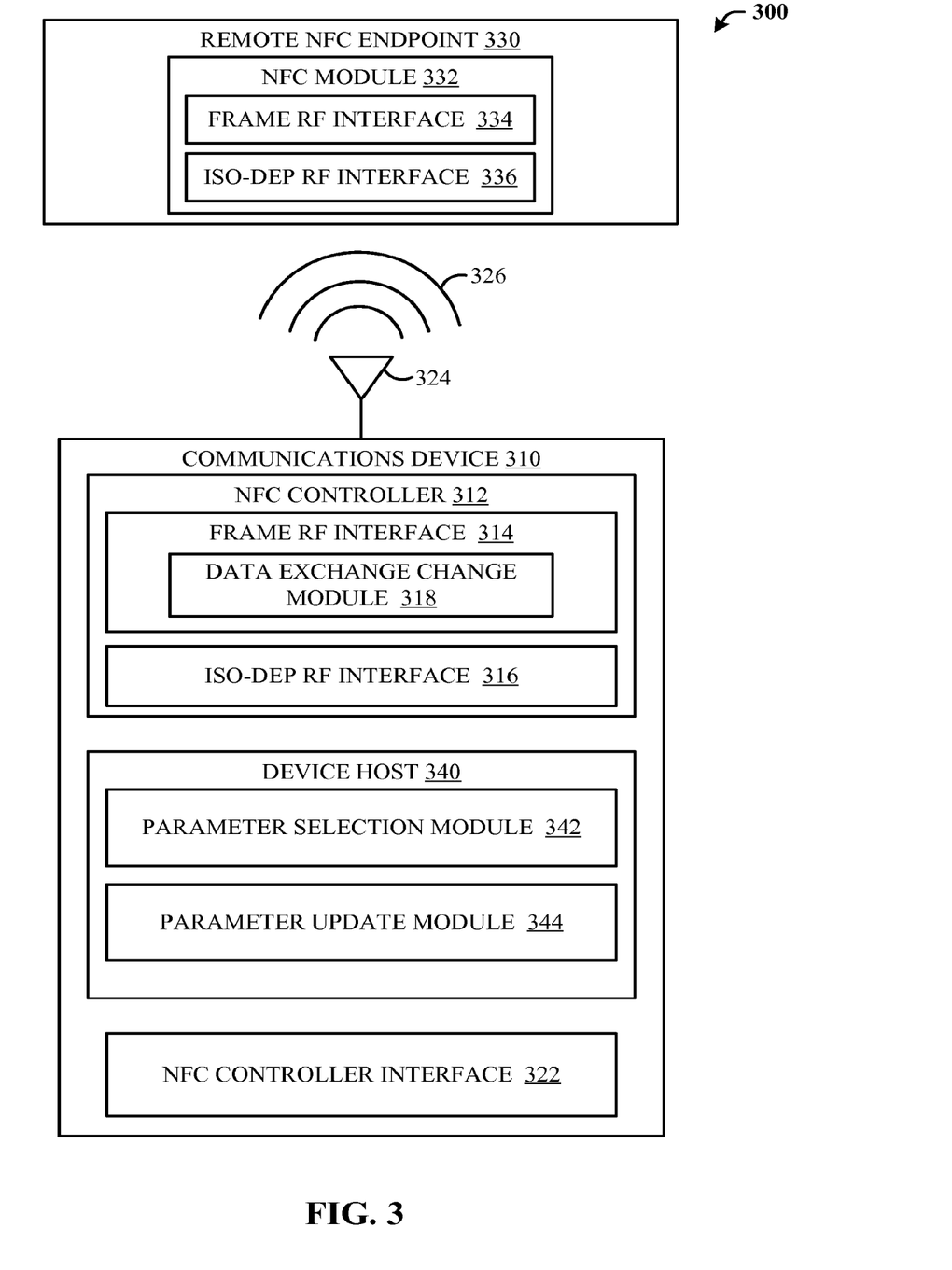
FIG. 3 is a block diagram of a NFC environment according to an aspect.

With reference to FIG. 3, a block diagram of a communication network 300 according to an aspect is illustrated. Communication network 300 may include communications device 310 which, through antenna 324, may be in communication with a remote NFC endpoint 330 using one or more NFC technologies 326 (e.g., NFC-A, NFC-B, NFC-F, etc.). In an aspect, remote NFC endpoint 330 may be operable to communicate using NFC module 332 through various interfaces, such as frame RF interface 334 and ISO-DEP RF interface 336. In another aspect, communications device 310 and remote NFC endpoint 330 may establish an ISO-DEP communication link using an ISO-DEP RF protocol. In still another aspect, communications device 310 may be operable to be connected to an access network and/or core network (e.g., a CDMA network, a GPRS network, a UMTS network, and other types of wireline and wireless communication networks).

In an aspect, communications device 310 may include a NFC controller 312, a NFC controller interface (NCI) 322, and device host 340. In an aspect, device host 340 may be operable to obtain, through NCI 322, and NFC Controller 312 information from remote NFC endpoint 330, through remote NFC endpoint 330 NFC module 332.

In an aspect, during ISO-DEP communications NFC Controller 312 may operate using an ISO-DEP RF interface 316. When operating using the ISO-DEP RF interface 316, NFC Controller 312 may be operable to change various parameters associated with data exchange between device host 340 and remote NFC endpoint 330 using data exchange change module 318.

Device host 340 may include, among other modules, parameter selection module 342 and parameter update module 344. In an operational aspect, when using a frame RF interface 314, NFC Controller 312 may act as a relay and merely communicate messages between communications device 310, device host 340 and remote NFC endpoint 330. In such an aspect, NFC controller 312 may not interpret the content of messages relayed between communications device 310, device host 340 and remote NFC endpoint 330. For example, when using frame RF interface 314 and NFC-B technology, the NFC Controller 312 operating either as a polling or as a listening device cannot interpret activation messages (e.g. ATTRIB command or ATTRIB response), and thus cannot update data exchange parameters included within the activation messages. In such an aspect, device host 340 may extract data exchange parameters from the activation messages, whether received from remote NFC endpoint 330 or created by DH 340. In an aspect, the data exchange parameters may include any combination of Minimum guard time (TR0), Minimum synchronization time (TR1), Minimum_frame delay time (TR2), Suppress start of sequence (SoS), and Suppress end of sequence (EoS). Parameter update module 344 may communicate some or all of the data exchange values obtained by parameter selection module 342 to NFC Controller 312. Further, communications from parameter update module 344 may prompt NFC controller 312 to change various data exchange configuration parameters. In other words, as NFC Controller 312 may not detect the content of the activation messages, device host 340 may communicate the necessary data exchange parameters using parameter update module 344. Parameter update module 344 may use messaging as defined in Tables 1, 2, 3 and 4.

TABLE 1

Control Message for Parameter Update Request
RF_PARAMETER_UPDATE_CMD

| Payload Field(s) | Length | Value/Description | | |
|---|---|---|---|---|
| Number of Parameters | 1 Octet | The number of RF Communication Parameter fields to follow (n). | | |
| RF Communication Parameter [1 . . . n] | x + 2 Octets | ID | 1 Byte | The identifier of the RF Communication Parameter as defined in Table 3. |
| | | Length | 1 Byte | The length of Value (x). |
| | | Value | x Bytes | Value of the RF Communication Parameter. |

TABLE 2

Control Message for Parameter Update Response
RF_PARAMETER_UPDATE_RSP

| Payload Field(s) | Length | Value/Description |
|---|---|---|
| Status | 1 Octet | See Table 89 |
| Number of | 1 Octet | The number of RF Communication |

TABLE 2-continued

Control Message for Parameter Update Response
RF_PARAMETER_UPDATE_RSP

| Payload Field(s) | Length | Value/Description |
|---|---|---|
| Parameters | | Parameter ID fields to follow (n). Value SHALL be 0 and no Parameter IDs listed unless Status = STATUS_INVALID_PARAM. |
| RF Communication Parameter ID [0 . . . n] | 1 Octet | The identifier of the invalid RF Communication Parameter. See Table 4 for a list of IDs. |

TABLE 3

Type Length Value (TLV) Coding for
RF Communication Parameter ID

| Type | Length | Value |
|---|---|---|
| 0x00 | 1 Octet | RF Technology and Mode, coded as defined in Table 91. |
| 0x01 | 1 Octet | Transmit Bit Rate, coded as defined in Table 92. |
| 0x02 | 1 Octet | Receive Bit Rate, coded as defined in Table 92. |
| 0x03 | 1 Octet | NFC-B Data Exchange Configuration, coded as defined in Table 4 |
| 0x04-0x7F | | Reserved for future use |
| 0x80-0xFF | | Proprietary |

TABLE 4

NFC-B Data Exchange Configuration Parameter

| | Bit Mask | | | | | | | |
|---|---|---|---|---|---|---|---|---|
| | b7 | b6 | b5 | b4 | b3 | b2 | b1 | b0 | Description |
| Octet 0 | X | X | | | | | | | Minimum TR0 as defined in [DIGITAL] |
| | | | X | X | | | | | Minimum TR1 as defined in [DIGITAL] |
| | | | | | X | | | | Suppression of EoS as defined in [DIGITAL] |
| | | | | | | X | | | Suppression of SoS as defined in [DIGITAL] |
| | | | | | | | X | X | Minimum TR2 as defined in [DIGITAL] |

The references within Tables 2 and 3 (e.g., Table 89, Table 91, Table 92) are made in the context of the NFC Forum NCI specification. Additionally, the references within Table 4 ([DIGITAL]) are made in the context of the NFC Forum DIGITAL Specification. Table 4 is not present in the NFC Forum NCI specification. As used herein, with reference to Tables 1-4, there may be situations in which the DH 340 may attempt to communicate updates of certain data exchange parameters in the NFC Controller 312. During such situations, the DH 340 sends a parameter update command (e.g., RF_PARAMETER_UPDATE_CMD) to NFC Controller 312. Table 1 provides an example parameter update command.

Continuing the above described operational aspect, with reference to Tables 2-4, when NFC Controller 312 receives the update command (e.g., RF_PARAMETER_UPDATE_CMD), the NFC Controller 312 responds with an update response (e.g., RF_PARAMETER_UPDATE_RSP). Table 2 provides an example parameter update response. In Table 2, the "Status" field indicates whether the setting of these RF Communication parameters was successful or not. For example, a "Status" of STATUS_OK SHALL indicates that all RF Communication parameters have been set within the NFC Controller 312 to values included in the parameter update command. By contrast, if the DH 340 tries to set a parameter which is not applicable for the NFC Controller 312, the NFC Controller 312 responds with a parameter update response (e.g., RF_PARAMETER_UPDATE_RSP) with a "Status" field of "invalid" (e.g., STATUS_INVALID_PARAM) and the response may include one or more invalid RF Communication parameter IDs. In an aspect, where some parameters are invalid, the remaining valid parameters are still used by the NFC Controller 312. Once NFC Controller 312 has communicated the parameter update response (e.g., RF_PARAMETER_UPDATE_RSP), the NFC Controller 312 uses the values of successfully updated data exchange parameter values at the appropriate time. For a polling device, the updated data exchange parameter values may be used upon receipt. For a listening device, the updated data exchange parameter values may be used once the next RF Frame has been sent (e.g., as defined in the present NCI specification).

Referring to Table 3, the "NFC-B Data Exchange Configuration" parameter specifies a number of NFC-B related values to be used by the NFCC during subsequent data exchange. This parameter includes values for Minimum TR0, Minimum TR1, Minimum TR2, Suppression of SoS, and Suppression of EoS. The format of the octet is defined in Table 4. In operation, not all values within "NFC-B Data Exchange Configuration" parameter may be relevant in a given mode of operation. In such an aspect, the NFC Controller may only update those values that are relevant to the given mode of operation.

As such, communication network 300 provides an environment to allow updating of data exchange parameters in a NFC controller 312 for ISO-DEP communication between a DH 340 and a remote NFC endpoint 330 when the NFC controller 312 is using a frame RF interface and NFC-B technology.

Figure 4:
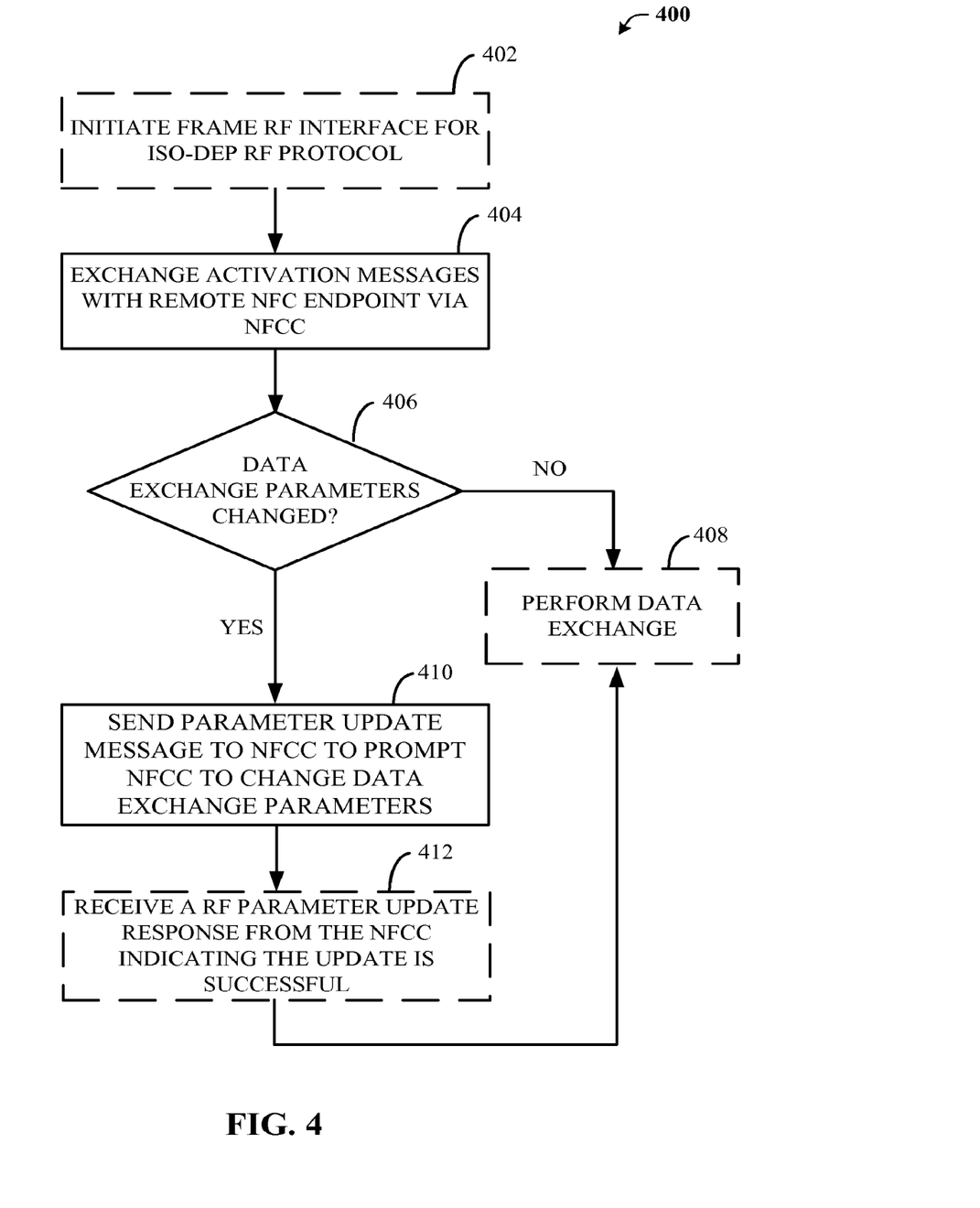
FIG. 4 is a flowchart describing an example of updating parameters when an ISO-DEP RF protocol is used with a frame RF interface with NFC-B technology, according to an aspect.
Figure 5:
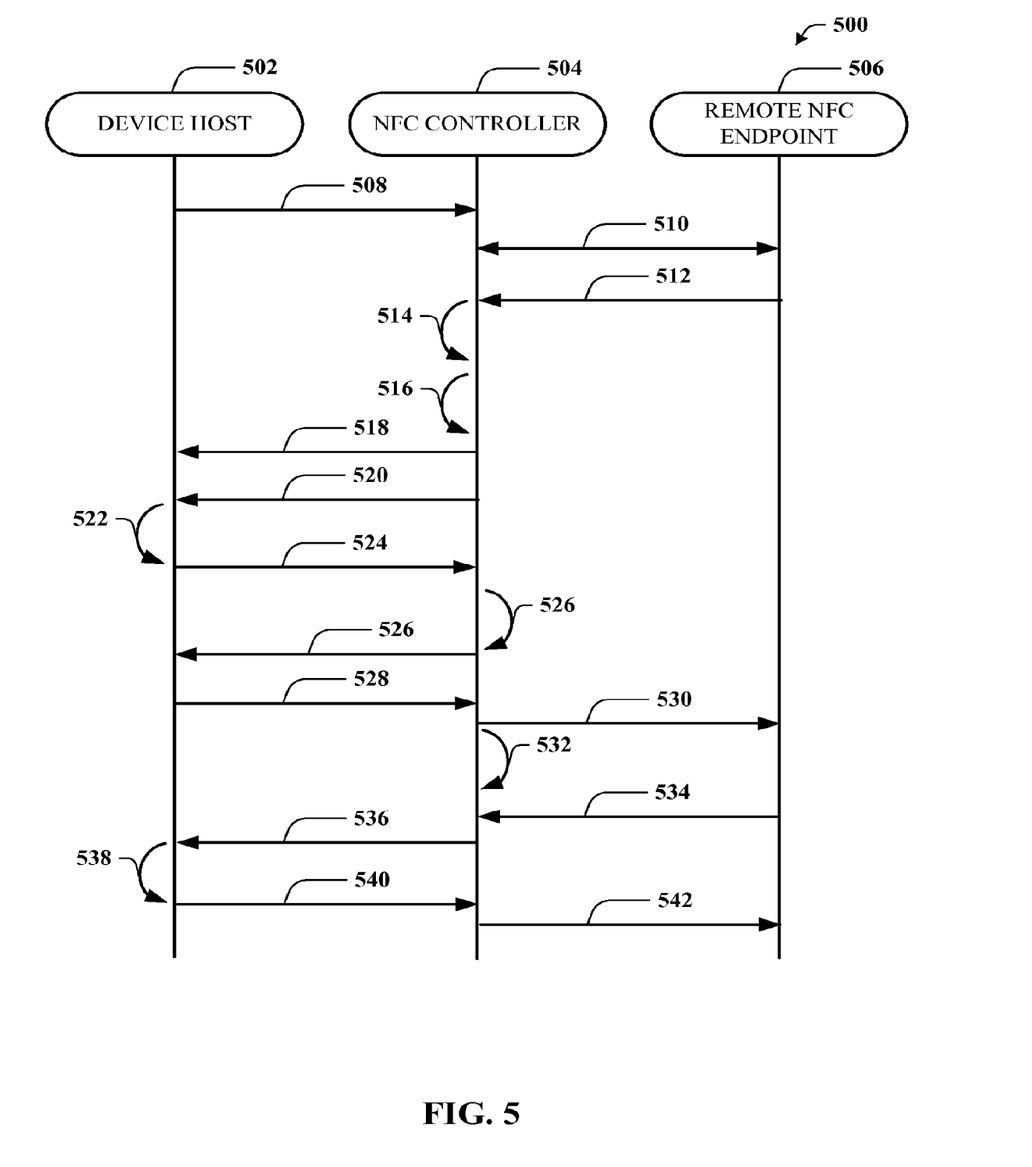
FIG. 5 is a call flow diagram describing an example of updating parameters when an ISO-DEP RF protocol is used in listening mode with a frame RF interface with NFC-B technology. according to an aspect.
Figure 6:
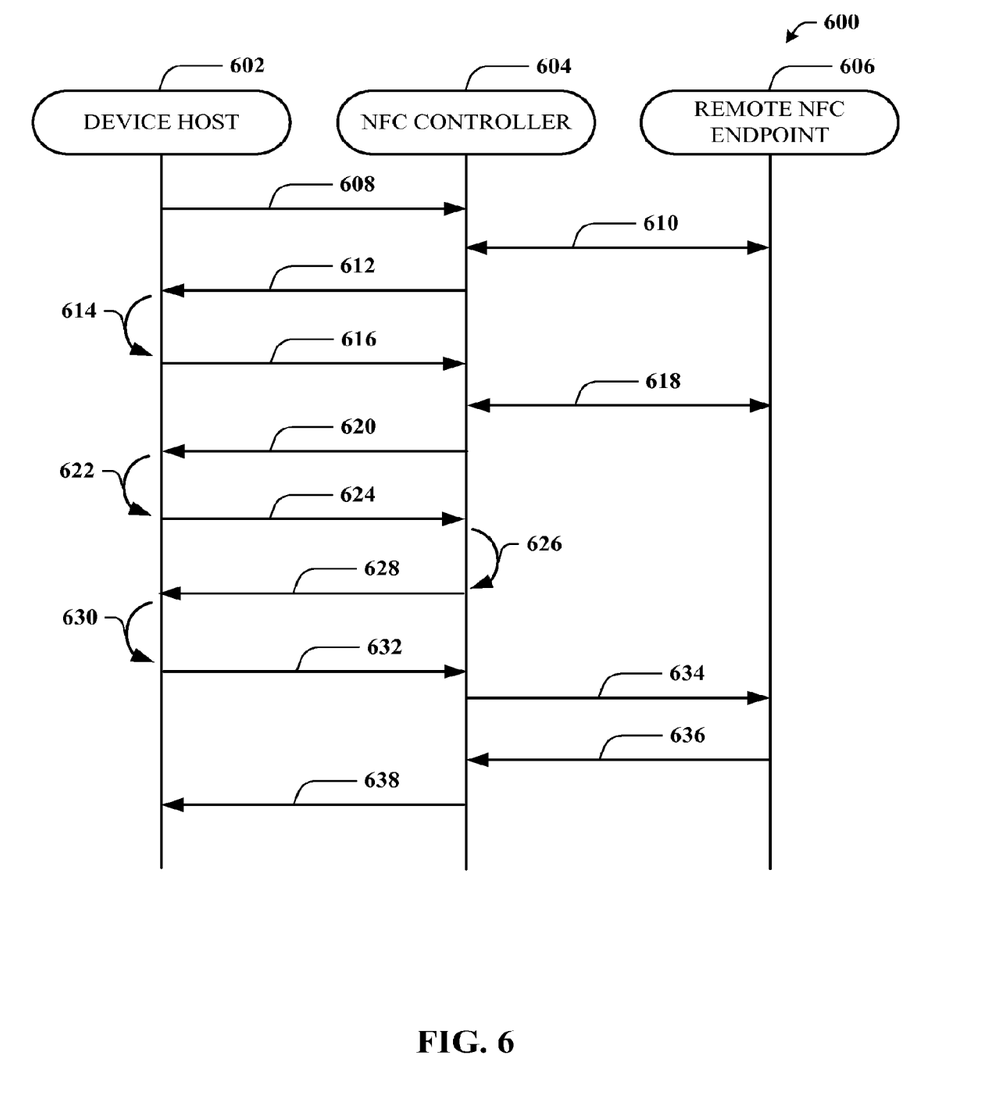
FIG. 6 is a call flow diagram describing an example of updating parameters when an ISO-DEP RF protocol is used in polling mode with a frame RF interface with NFC-B technology according to an aspect.

FIGS. 4-6 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 4, an example flowchart describing a process 400 for updating data exchange configuration parameters for ISO-DEP communication between a DH and a remote NFC endpoint is illustrated.

In an optional aspect, at block 402, a data exchange process may be enabled using an ISO-DEP RF protocol with a frame RF interface. In an aspect, NFC-B technology is used by the NFCC in receiving and/or sending data associated with the enabled process.

At block 404, the DH may exchange activation messages with a remote NFC endpoint. In an aspect, the activation messages are an ATTRIB command and an ATTRIB response, and include one or more parameters associated with data exchange configuration. At block 406, DH may compare relevant data exchange parameters currently used by the NFCC with data exchange parameters provided in the received activation command.

If at block 406 the DH determines that none of the relevant parameters are different, in an optional aspect, at block 408 DH may initiate communications with the remote NFC endpoint using the enabled ISO-DEP protocol. By contrast, if at block 406 the DH determines that one or more of the relevant data exchange parameters are different, then at block 410 the DH generates and transmits a parameter update message to the NFCC to prompt to the NFCC to update the currently used data exchange parameters to those included in the parameter update message. This update may be performed upon receipt of the update message, or it may be delayed to a time following the transmission of the next RF Frame. In an aspect, the parameter update messages may be formatted using fields described in Tables 1-4. Specifically, the update may be immediate for a polling device, and delayed for a listening device. As noted in Tables 1-4, a reference to a NFC-B data exchange configuration table may be included in the RF parameter update command.

In an optional aspect, at block 412, the DH may receive a RF parameter response (e.g., RF_PARAMETER_UPDATE_RSP) indicating successful receipt and/or implementation of data exchange parameters included in the RF parameter update command. Once the NFCC has updated the one or more parameters, the process may continue to optional block 408 to allow the DH to initiate communications with the remote NFC endpoint using the enabled ISO-DEP protocol.

With reference now to FIG. 5, an example listen side call flow diagram describing a system for updating parameters for ISO-DEP communication between a DH and a remote NFC endpoint using a NFCC is illustrated. As depicted in FIG. 5 a NFC environment 500 may include a device host 502, a NFCC 504 and a remote NFC endpoint 506. Device host 502 may be implemented in Poll Mode or Listening Mode. As used herein, a polling device is the one that has sent the initial command to which the listening device replied with a response. Subsequently, both devices will "transmit" and "receive" in turn. In other words, the polling device performs the role of a reader/writer, and the listening device performs the role of a card emulator.

At act 508, the DH 502 may initiate communications to use a frame RF interface for ISO-DEP RF protocol communications. At act, 510 sense request and response communications may be sent between NFCC 504 and remote NFC endpoint 506. In an aspect, where NFC-B technology is used, the sense request may be a SENSB_REQ and the sense response may be a SENSB_RES. At act 512, an activation command (e.g., ATTRIB command) is transmitted from remote NFC endpoint 506 to NFCC 504. As communications have been set up using a frame RF interface, the message may be received as a RF Frame (ATTRIB command) message. At act 514 the NFCC 504 may recognize the message as a valid activation command indicating an ISO-DEP protocol. At act 516, NFCC 504 may determine the RF interface in used for ISO-DEP protocol communications is "Frame." In response to receiving a communication from remote NFC endpoint, at act 518, NFCC 504 may transmit a RF interface activation notification (e.g., RF_INTF_ACTIVATED_NTF) message to DH 502. In an aspect, the notification may indicate the protocol as ISO-DEP and the interface as "Frame." Further, in response to detecting the ISO_DEP protocol is "Frame", at act 520 NFCC 504 transmits the activation command to DH 502.

At act 522, DH 502 may parse the activation command and extract data exchange parameters that are applicable to NFCC 504, and may generate an update message including the relevant extracted data exchange parameters. In an aspect, the data exchange parameters include some or all of Minimum TR0, Minimum TR1, Minimum TR2, Suppression of SoS, and Suppression of EoS. At act 524, DH 502 may transmit the update message to NFCC 504. In an aspect, the update message is an RF_PARAMETER_UPDATE_CMD and includes the relevant extracted data exchange parameters. Additionally, the determined data exchange parameters may be selected to align with one or more parameters communicated as part of an ISO-DEP RF protocol update process.

Act 526, NFCC 504 may store the received data exchange parameters, and at act 526, a RF parameter update response (e.g., RF_PARAMETER_UPDATE_RSP) may be transmitted by NFCC 504 to DH 502. At act 528, DH 502 transmits a response to the activation command, and at block 530, the response is relayed to remote NFC endpoint 506. At act 532, NFCC 504 may update data exchange parameters and the updated NFC-B data exchange parameters may be used for subsequence exchanges of ISO-DEP blocks at the specified time.

As such, data exchange parameters associated with NFCC 504 are updated in accordance with the activation command received at act 512, and at act 534 NFCC 504 may receive an ISO-DEP block from remote NFC endpoint 506 which may be relayed the block on to DH 502 at act 536. At act 538, the received ISO-DEP block may be processed using ISO-DEP listen side protocols, and at act 540 an ISO-DEP block may be transmitted to NFCC 504 to be relayed on to remote NFC endpoint 506 at act 542.

With reference now to FIG. 6, an example polling side call flow diagram describing a system for updating parameters for ISO-DEP communication between a DH and a remote NFC endpoint using a NFCC is illustrated. As depicted in FIG. 6 a NFC environment 600 may include a device host 602, a NFCC 604 and a remote NFC endpoint 606.

At act 608, the DH 602 may initiate communications to use a frame RF interface for ISO-DEP RF protocol communications. At act, 610 sense request and response communications may be sent between NFCC 604 and remote NFC endpoint 606. In an aspect, where NFC-B technology is used, the sense request may be a SENSB_REQ and the sense response may be a SENSB_RES. At act 612, NFCC 604 may transmit a RF interface activation notification (e.g., RF_INTF_ACTIVATED_NTF) message to DH 602. In an aspect, the notification may indicate the protocol as ISO-DEP and the interface as "Frame." While acting in polling mode, DH 602 may generate an activation command (e.g., ATTRIB command) that may be transmitted to NFCC 604 at act 616. As NFCC 604 is using Frame RF interface, NFCC 604 may act as a relay and communicate the activation command to remote NFC endpoint 606. Remote NFC endpoint 606 may receive the activation command, generate an activation response, and transmit the activation response (e.g., ATTRIB response) at act 618. At act 620, NFCC 604 transmits the activation response to DH 602.

At act 622, DH 602 may parse the activation response and extract data exchange parameters that are applicable to NFCC 604, and may generate an update message including the relevant extracted data exchange parameters. In an aspect, the data exchange parameters include some or all of Minimum TR0, Minimum TR1, Minimum TR2, Suppression of SoS, and Suppression of EoS. At act 624, DH 602 may transmit the update message to NFCC 604. In an aspect, the update message is an RF_PARAMETER_UPDATE_CMD and includes the relevant extracted or selected data exchange parameters. Additionally, the determined data exchange parameters may be selected to align with one or more parameters communicated as part of an ISO-DEP RF protocol update process.

At act 626, NFCC 604 updates the poll side parameter values with the values included in the command for use during data exchange. At act 628, a RF parameter update response (e.g., RF_PARAMETER_UPDATE_RSP) may be transmitted by NFCC 604 to DH 602 indicating the values have been updated.

As such, data exchange parameters associated with NFCC 604 are updated in accordance with the activation response received at act 620, and at act 630, DH 602 may generate an ISO-DEP block as part of ISO-DEP communication with remote NFC endpoint 606. At act 632, the data block is communicated to NFCC 604 which relayed the data to remote NFC endpoint 606 at act 634. At act 636, remote NFC endpoint 606 responds with an ISO-DEP block transmission to NFCC 604, and at act 638 the response may be relayed to DH 602.

Figure 7:
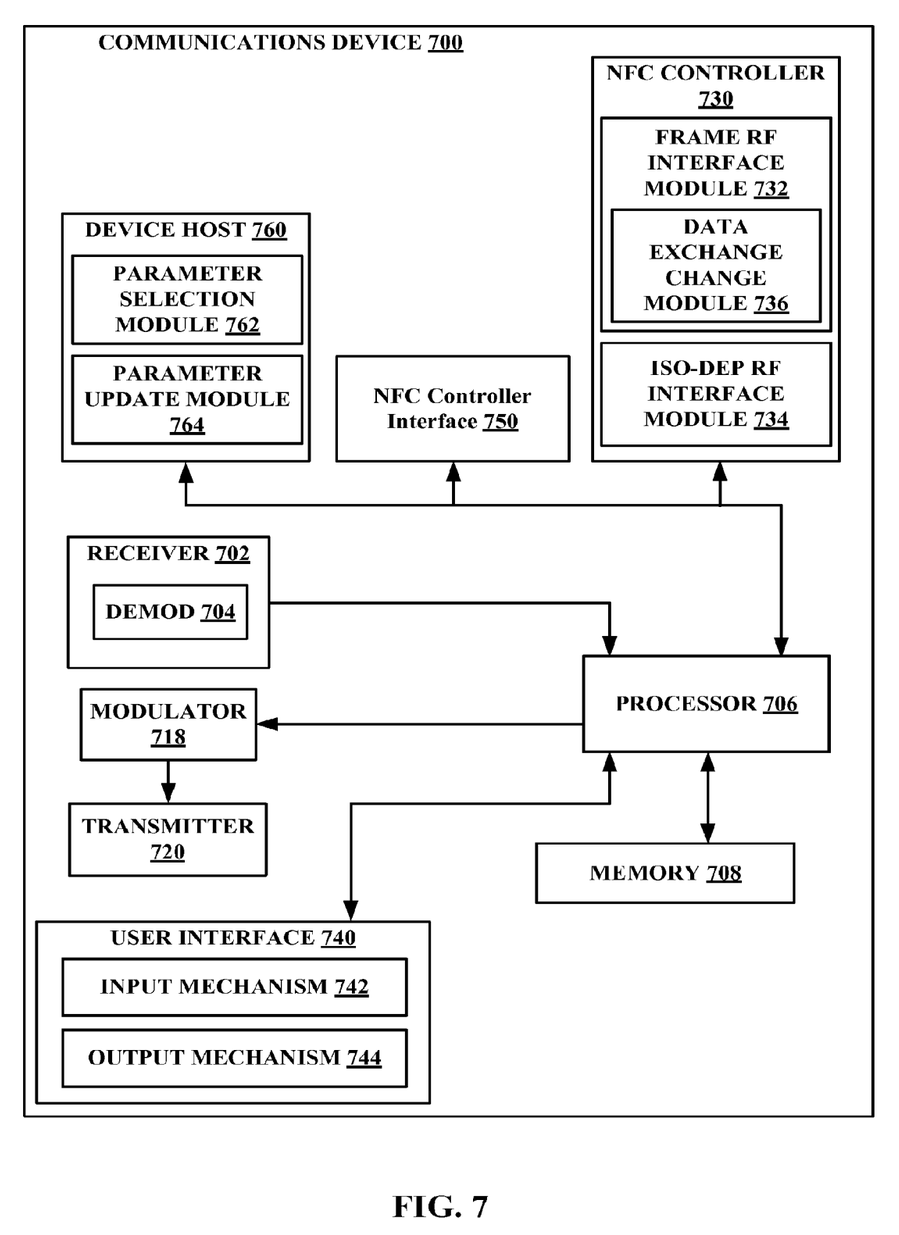
FIG. 7 is a functional block diagram of an example architecture of a communications device, according to an aspect.

While referencing FIG. 3, but turning also now to FIG. 7, an example architecture of communications device 700 is illustrated. As depicted in FIG. 7, communications device 700 includes receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to processor 706 for channel estimation. Processor 706 can be a processor dedicated to analyzing information received by receiver 702 and/or generating information for transmission by transmitter 720, a processor that controls one or more components of communications device 700, and/or a processor that both analyzes information received by receiver 702, generates information for transmission by transmitter 720, and controls one or more components of communications device 700. Further, signals may be prepared for transmission by transmitter 720 through modulator 718 which may modulate the signals processed by processor 706.

Communications device 700 can additionally comprise memory 708 that is operatively coupled to processor 706 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, processor 706, receiver 702, transmitter 720, NFCC 730, and/or DH 760 can provide means for receiving an activation message from a NFCC 730 that is using a Frame RF interface over NFC-B RF technology, means for determining that one or more data exchange parameters included in the activation message are different from one or more corresponding current relevant data exchange parameters that the NFCC 730 is configured to implement, means for generating an RF parameter update command including the one or more data exchange parameters corresponding to the one or more current relevant data exchange parameters that are determined to be different, and means for send the generated RF parameter update command to the NFCC 730 to prompt the NFCC 730 to update the one or more corresponding current relevant data exchange parameters.

It will be appreciated that data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 708 of the subject systems and methods may comprise, without being limited to, these and any other suitable types of memory.

In another aspect, communications device 700 may include NCI 750. In an aspect, NCI 750 may be operable to enable communications between a DH 760 and NFC controller 730.

Communications device 700 may include a NFC controller 730. In an aspect, NFC Controller 730 may be operable to obtain, through NCI 750, information from other devices, such as remote NFC endpoint 330. During ISO-DEP communication NFC Controller 730 may operate using a frame RF interface 314 or an ISO-DEP interface 734. When operating using the ISO-DEP interface 734, NFC Controller 730 may be operable to change various parameters associated with communications between device host 760 and remote NFC endpoint 330 using data exchange change module 736.

Device host 760 may include, among other modules, parameter selection module 762 and parameter update module 764. In an operational aspect, when using a frame RF interface 732, NFC Controller 730 may act as a relay and merely communicate messages between device host 760 and a remote NFC endpoint. In such an aspect, NFC controller 730 may not interpret the content of messages relayed between device host 760 and the remote NFC endpoint. For example, when using frame RF interface 732 and NFC-B technology, the NFC Controller 730 cannot interpret activation messages (e.g. ATTRIB command or ATTRIB response), and thus cannot update data exchange parameters included within the activation messages. In such an aspect, device host 760 may extract data exchange parameters from the activation messages exchanged with the remote NFC endpoint. In an aspect, the data exchange parameters may include any combination of Minimum guard time (TR0), Minimum synchronization time (TR1), Minimum frame delay time (TR2), Suppress start of sequence (SoS), and Suppress end of sequence (EoS). Parameter update module 764 may communicate the relevant data exchange parameters obtained by parameter selection module 762 to NFC Controller 730. Further, communications from parameter update module 764 may prompt NFC controller 730 to change various data exchange configuration parameters. In other words, as NFC Controller 730 may not detect the content of the activation command, device host 760 may communicate the necessary data exchange parameters to NFC Controller 730 using parameter update module 764. As noted above, parameter update module 764 may use messaging as defined in Tables 1, 2, 3 and 4. Again as noted above, the parameter update module 764 may update once it has received the parameter update command, or it may hold the values (e.g. store in memory 708) for updating after the next RF Frame has been sent (e.g., as noted in the current NCI specification).

Additionally, communications device 700 may include user interface 740. User interface 740 may include input mechanisms 742 for generating inputs into communications device 700, and output mechanism 744 for generating information for consumption by the user of the communications device 700. For example, input mechanisms 742 may include a mechanism such as a key or keyboard, a mouse, a touchscreen display, a microphone, etc. Further, for example, output mechanism 744 may include a display, an audio speaker, a haptic feedback mechanism, a Personal Area Network (PAN) transceiver etc. In the illustrated aspects, the output mechanism 744 may include a display operable to present media content that is in image or video format or an audio speaker to present media content that is in an audio format.

Figure 8:
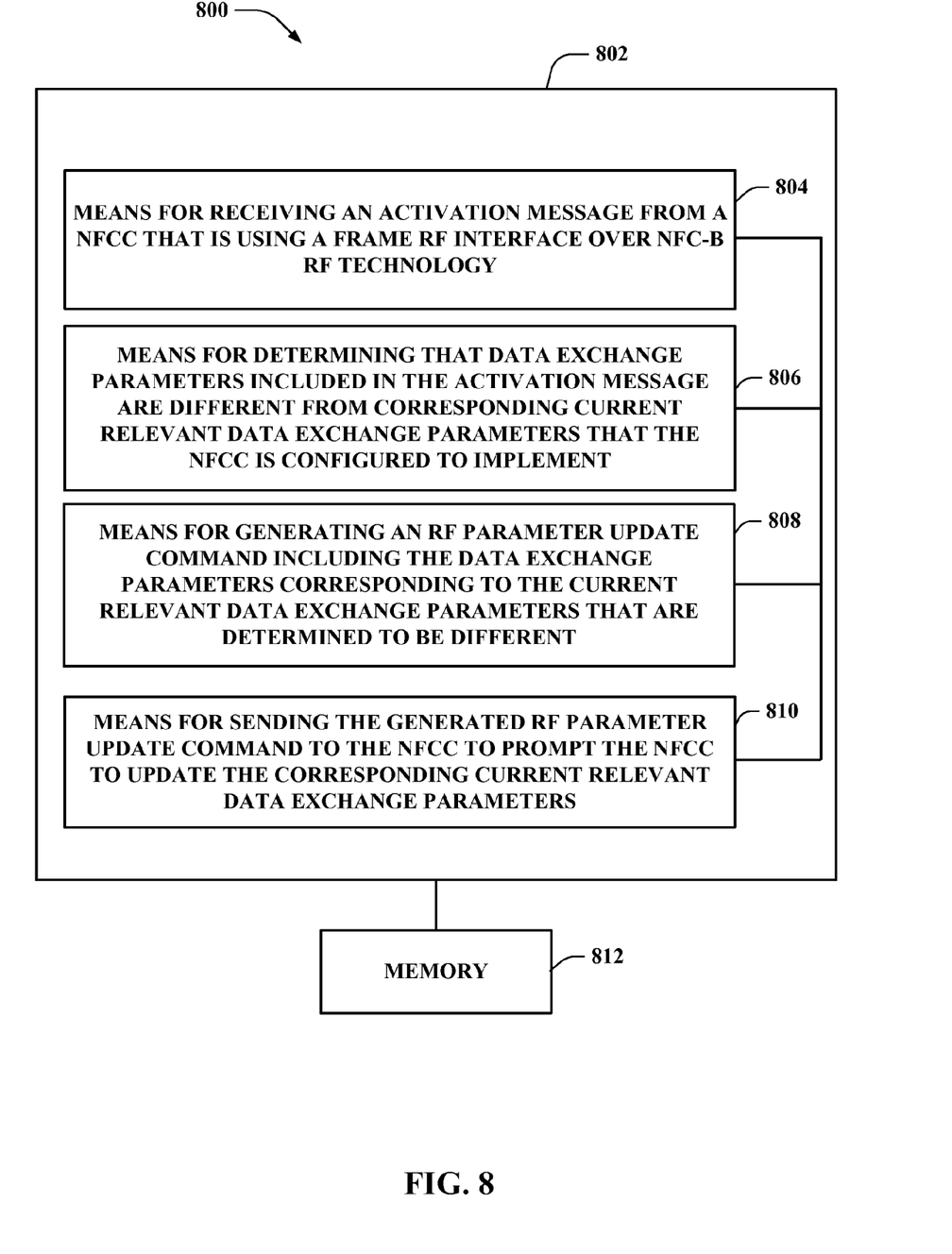
FIG. 8 a functional block diagram of an example communication system for updating parameters when an ISO-DEP RF protocol is used with a frame RF interface with NFC-B technology, according to an aspect.

FIG. 8 an apparatus 800 that improves mechanisms for prompting a NFCC to update data exchange parameters for ISO-DEP communications between a DH and a remote NFC endpoint can reside at least partially within a DH. It is to be appreciated that apparatus 800 is represented as including functional blocks, which can represent functions implemented by a processor, software, or combination thereof (e.g., firmware).

As such, apparatus 800 includes a logical grouping 802 of electrical components that can act in conjunction. For instance, logical grouping 802 can include means for receiving an activation message from a NFCC that is using a Frame RF interface over NFC-B RF technology (Block 804). For example, in an aspect, the means 804 can include DH 760 of communications device 700 and/or processor 706 of communications device 700. In an aspect, the activation message may be an ATTRIB command or ATTRIB response. In another aspect, the means for receiving 804 may be further configured to receive a RF parameter update response from the NFCC indicating the one or more data exchange parameters have been successfully updated. In such an aspect, the RF parameter update response may be an RF_PARAMETER_UPDATE_RSP message.

Further, logical grouping 802 can include means for determining that one or more data exchange parameters included in the activation message are different from one or more corresponding current relevant data exchange parameters that the NFCC is configured to implement (Block 806). For example, in an aspect, the means for determining 806 can include DH 760 of communications device 700 and/or processor 706 of communications device 700. In an aspect, the one or more data exchange parameters may include Minimum TR0, Minimum TR1, Minimum TR2, Suppress SoS, EoS, etc. In another aspect, the one or more data exchange parameters may be determined to align with one or more parameters communicated as part of an ISO-DEP RF protocol update process.

In an optional aspect, logical grouping 802 can include means for generating an RF parameter update command including the one or more data exchange parameters corresponding to the one or more current relevant data exchange parameters that are determined to be different (Block 808). For example, in an aspect, the means for generating 808 can include DH 760 of communications device 700 and/or processor 706 of communications device 700. In an aspect, the means for generating 808 may be configured to include a reference to a NFC-B data exchange configuration table in the RF parameter update command that includes a bit mask indicating the one or more data exchange parameters.

In another optional aspect, logical grouping 802 can include means for sending the generated RF parameter update command to the NFCC to prompt the NFCC to update the one or more corresponding current relevant data exchange parameters with the one or more data exchange parameters included in the RF parameter update command (Block 810). For example, in an aspect, the means for sending 810 can include DH 760 of communications device 700 and/or processor 706 of communications device 700. In such an aspect, where the NFCC is in a polling mode, the activation message may be an activation response, and the NFCC may update the one or more data exchange parameters prior to transmission of the RF parameter update response to the DH. In another aspect, where the NFCC is in a listening mode, the activation message may be an activation command. In such an aspect, the NFCC may store the one or more data exchange parameters prior to transmission of the RF parameter update response to the DH, and the means for sending may be further configured to send an activation response to the NFCC, and the NFCC may update the one or more data exchange parameters after sending the activation response message to a remote NFC endpoint. In an aspect, the RF parameter update response may include an RF_PARAMETER_UPDATE_RSP message.

Additionally, apparatus 800 can include a memory 812 that retains instructions for executing functions associated with electrical components 804, 806, 808, and 810. While shown as being external to memory 812, it is to be understood that one or more of electrical components 804, 806, 808, and 810 can exist within memory 812. In an aspect, for example, memory 812 may be the same as or similar to memory 708 (FIG. 7). In another aspect, memory 812 may be associated with DH 760 and/or NFCC 730.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC-F, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product. In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of communications, comprising:
    sending, by a near field communication controller (NFCC), an activation message to a device host (DH), wherein the NFCC is using a Frame radio frequency (RF) interface over NFC-B RF technology; and receiving a generated RF parameter update command from the DH to prompt the NFCC to update one or more corresponding current relevant data exchange parameters with one or more data exchange parameters included in the RF parameter update command.

2. The method of claim 1, wherein one or more data exchange parameters included in the activation message are different from one or more corresponding current relevant data exchange parameters that the NFCC is configured to implement.

3. The method of claim 2, wherein the RF parameter update command includes the one or more corresponding current relevant data exchange parameters that are determined to be different.

4. The method of claim 1, wherein the one or more data exchange parameters comprise at least one parameter of: Minimum guard time (TR0), Minimum synchronization time (TR1), Minimum frame delay time (TR2), Suppress start of sequence (SoS), and Suppress end of sequence (EoS).

5. The method of claim 1, wherein the generated RF parameter update command includes a reference to a NFC-B data exchange configuration table that includes a bit mask indicating the one or more data exchange parameters.

6. The method of claim 1, further comprising:
sending an RF parameter update response to the DH indicating the one or more data exchange parameters have been successfully updated.

7. The method of claim 6, wherein the NFCC is in a polling mode, wherein the activation message is an activation response, and wherein the NFCC updates the one or more data exchange parameters prior to transmission of the RF parameter update response to the DH.

8. The method of claim 6, wherein the NFCC is in a listening mode, wherein the activation message is an activation command, wherein the NFCC stores the one or more data exchange parameters prior to transmission of the RF parameter update response to the DH, wherein the method further comprises receiving an activation response from the DH, and wherein the NFCC updates the one or more data exchange parameters after sending the activation response message to a remote NFC endpoint.

9. The method of claim 6, wherein the RF parameter update response comprises an RF_PARAMETER_UPDATE_RSP message.

10. The method of claim 1, wherein the activation message comprises either an ATTRIB command or ATTRIB response.

11. The method of claim 1, wherein the RF parameter update command comprises an RF_PARAMETER_UPDATE_CMD message.

12. The method of claim 1, wherein the one or more data exchange parameters are determined to align with one or more parameters communicated as part of an ISO-DEP RF protocol update process.

13. A computer-program product for wireless communications, the computer-program product comprising a non-transitory computer-readable medium having instructions thereon, the instructions comprising:
code for causing a near field communication controller (NFCC) to send an activation message to a device host (DH), wherein the NFCC is using a Frame radio frequency (RF) interface over NFC-B RF technology; and
code for causing the NFCC to receive a generated RF parameter update command from the DH to prompt the NFCC to update one or more corresponding current relevant data exchange parameters with one or more data exchange parameters included in the RF parameter update command.

14. The computer program product of claim 13, wherein one or more data exchange parameters included in the activation message are different from one or more corresponding current relevant data exchange parameters that the NFCC is configured to implement.

15. The computer program product of claim 14, wherein the RF parameter update command includes the one or more corresponding current relevant data exchange parameters that are determined to be different.

16. The computer program product of claim 13, wherein the one or more data exchange parameters comprise at least one parameter of: Minimum guard time (TR0), Minimum synchronization time (TR1), Minimum frame delay time (TR2), Suppress start of sequence (SoS), and Suppress end of sequence (EoS).

17. The computer program product of claim 13, wherein the generated RF parameter update command includes a reference to a NFC-B data exchange configuration table that includes a bit mask indicating the one or more data exchange parameters.

18. The computer program product of claim 13, wherein the instructions further comprise code for causing the NFCC to send an RF parameter update response to the DH indicating the one or more data exchange parameters have been successfully updated.

19. The computer program product of claim 18, wherein the NFCC is in a polling mode, wherein the activation message is an activation response, and wherein the NFCC updates the one or more data exchange parameters prior to transmission of the RF parameter update response to the DH.

20. The computer program product of claim 18, wherein the NFCC is in a listening mode, wherein the activation message is an activation command, wherein the NFCC stores the one or more data exchange parameters prior to transmission of the RF parameter update response to the DH, wherein the method further comprises receiving an activation response from the DH, and wherein the NFCC updates the one or more data exchange parameters after sending the activation response message to a remote NFC endpoint.

21. The computer program product of claim 18, wherein the RF parameter update response comprises an RF_PARAMETER_UPDATE_RSP message.

22. The computer program product of claim 13, wherein the activation message comprises either an ATTRIB command or ATTRIB response.

23. The computer program product of claim 13, wherein the RF parameter update command comprises an RF_PARAMETER_UPDATE_CMD message.

24. The computer program product of claim 13, wherein the one or more data exchange parameters are determined to align with one or more parameters communicated as part of an ISO-DEP RF protocol update process.

25. An apparatus for communications, comprising:
means for sending, by a near field communication controller (NFCC), an activation message to a device host (DH), wherein the NFCC is using a Frame radio frequency (RF) interface over NFC-B RF technology; and
means for receiving a generated RF parameter update command from the DH to prompt the NFCC to update one or more corresponding current relevant data exchange parameters with one or more data exchange parameters included in the RF parameter update command.

26. The apparatus of claim 25, wherein one or more data exchange parameters included in the activation message are different from one or more corresponding current relevant data exchange parameters that the NFCC is configured to implement.

27. The apparatus of claim 26, wherein the RF parameter update command includes the one or more corresponding current relevant data exchange parameters that are determined to be different.

28. The apparatus of claim 25, wherein the one or more data exchange parameters comprise at least one parameter of: Minimum guard time (TR0), Minimum synchronization time (TR1), Minimum frame delay time (TR2), Suppress start of sequence (SoS), and Suppress end of sequence (EoS).

29. The apparatus of claim 25, wherein the generated RF parameter update command includes a reference to a NFC-B data exchange configuration table that includes a bit mask indicating the one or more data exchange parameters.

30. The apparatus of claim 25, further comprising:
means for sending an RF parameter update response to the DH indicating the one or more data exchange parameters have been successfully updated.

31. The apparatus of claim 30, wherein the NFCC is in a polling mode, wherein the activation message is an activation response, and wherein the NFCC updates the one or more data exchange parameters prior to transmission of the RF parameter update response to the DH.

32. The apparatus of claim 30, wherein the NFCC is in a listening mode, wherein the activation message is an activation command, wherein the NFCC stores the one or more data exchange parameters prior to transmission of the RF parameter update response to the DH, wherein the method further comprises receiving an activation response from the DH, and wherein the NFCC updates the one or more data exchange parameters after sending the activation response message to a remote NFC endpoint.

33. The apparatus of claim 30, wherein the RF parameter update response comprises an RF_PARAMETER_UPDATE_RSP message.

34. The apparatus of claim 25, wherein the activation message comprises either an ATTRIB command or ATTRIB response.

35. The apparatus of claim 25, wherein the RF parameter update command comprises an RF_PARAMETER_UPDATE_CMD message.

36. The apparatus of claim 25, wherein the one or more data exchange parameters are determined to align with one or more parameters communicated as part of an ISO-DEP RF protocol update process.

37. An apparatus for communications, comprising:
a near field communication controller (NFCC) configured to:
send an activation message to a device host (DH), wherein the NFCC is using a Frame radio frequency (RF) interface over NFC-B RF technology; and
receive a generated RF parameter update command from the DH to prompt the NFCC to update one or more corresponding current relevant data exchange parameters with one or more data exchange parameters included in the RF parameter update command.

38. The apparatus of claim 37, wherein one or more data exchange parameters included in the activation message are different from one or more corresponding current relevant data exchange parameters that the NFCC is configured to implement.

39. The apparatus of claim 38, wherein the RF parameter update command includes the one or more corresponding current relevant data exchange parameters that are determined to be different.

40. The apparatus of claim 37, wherein the one or more data exchange parameters comprise at least one parameter of: Minimum guard time (TR0), Minimum synchronization time (TR1), Minimum frame delay time (TR2), Suppress start of sequence (SoS), and Suppress end of sequence (EoS).

41. The apparatus of claim 37, wherein the generated RF parameter update command includes a reference to a NFC-B data exchange configuration table that includes a bit mask indicating the one or more data exchange parameters.

42. The apparatus of claim 37, wherein the NFCC is further configured to:
send an RF parameter update response to the DH indicating the one or more data exchange parameters have been successfully updated.

43. The apparatus of claim 42, wherein the NFCC is in a polling mode, wherein the activation message is an activation response, and wherein the NFCC updates the one or more data exchange parameters prior to transmission of the RF parameter update response to the DH.

44. The apparatus of claim 42, wherein the NFCC is in a listening mode, wherein the activation message is an activation command, wherein the NFCC stores the one or more data exchange parameters prior to transmission of the RF parameter update response to the DH, wherein the method further comprises receiving an activation response from the DH, and wherein the NFCC updates the one or more data exchange parameters after sending the activation response message to a remote NFC endpoint.

45. The apparatus of claim 42, wherein the RF parameter update response comprises an RF_PARAMETER_UPDATE_RSP message.

46. The apparatus of claim 37, wherein the activation message comprises either an ATTRIB command or ATTRIB response.

47. The apparatus of claim 37, wherein the RF parameter update command comprises an RF_PARAMETER_UPDATE_CMD message.

48. The apparatus of claim 37, wherein the one or more data exchange parameters are determined to align with one or more parameters communicated as part of an ISO-DEP RF protocol update process.

* * * * *